United States Patent

[11] 3,548,106

[72] Inventors William Keith Ross Watson
Corona Del Mar;
John F. Hunter, La Mirada, Calif.

[21] Appl. No. 847,798
[22] Filed July 24, 1969
Continuation of Ser. No. 536,907, Mar. 23, 1966, abandoned.
[45] Patented Dec. 15, 1970
[73] Assignee Anaconda Wire and Cable Company
New York, N.Y.
a corporation of Delaware. by mesne assignments

[54] RURAL SUBSCRIBER TELEPHONE SYSTEM
6 Claims, 4 Drawing Figs.

[52] U.S. Cl. .......... 179/15, 179/2.5, 325/5, 325/53, 343/177
[51] Int. Cl. .......... H04j 1/10
[50] Field of Search .......... 179/15, 2.5; 325/5, 53; 343/177

[56] References Cited

UNITED STATES PATENTS 2,064,904 12/1936 Green .......... 325/5X

*Primary Examiner*—Ralph D. Blakeslee
*Attorney*—White and Haefliger

ABSTRACT: A multichannel telephone system includes a central station and multiple subscriber stations, the latter each including means operable in response to subscriber call initiation to select an unused transmission channel from a first group of transmission channels, to intelligence modulate the selected transmission mode $f_t$ and to pass the modulated mode $f_t$ to a transmission line; the central station including means operable in response to central station call initiation to select an unused transmission channel from a second group of transmission channels, to intelligence modulate the selected transmission mode $f_e$ and to pass the modulated mode $f_e$ to the line; and each subscriber station includes a demodulator to which signals $f_{e1}$—$f_{en}$ including modulated $f_e$ are transmitted from the central station, and to which unmodulated signals $f_{e1}$—$f_{en}$ are selectively transmitted via a gate, there being logic circuitry responsive to central station call initiation to control the gate to transmit unmodulated $f_e$ corresponding to modulated $f_e$; the central station including means to receive modulated mode $f_t$ from the line and to demodulate the received and modulated mode $f_t$.

INVENTORS.
WILLIAM KEITH ROSS WATSON
JOHN F. HUNTER
By White & Haefliger
ATTORNEYS.

INVENTORS.
WILLIAM KEITH ROSS WATSON
JOHN F. HUNTER
By White & Haefliger
ATTORNEYS.

INVENTORS.
WILLIAM KEITH ROSS WATSON
JOHN F. HUNTER
BY White & Haefliger
ATTORNEYS.

RURAL SUBSCRIBER TELEPHONE SYSTEM

This application is a continuation of application Ser. No. 537,907, filed Mar. 23, 1966, now abandoned.

This invention relates generally to carrier wave telephony, and more particularly concerns improvements in systems that include a central office servicing a number of subscribers connected to a common transmission line. Generally speaking, prior carrier wave telephony systems have required a separate carrier frequency or channel for each subscriber unit, so that the more subscribers were on the line, the more channels were also required.

It is a major object of the invention to provide for peak hour first class service to subscribers connected to a common transmission line where the number of available channels is less than the number of subscribers, thereby reducing the amount and expense of needed equipment. In this regard, first class service may be considered as involving less than one failure to obtain call utilization of the transmission line in over one thousand calls. Basically, this major object and the desirable results flowing therefrom are realized according to the invention through the provision of a system wherein communication between a subscriber station and a central office may be initiated by the subscriber station selection of an unused carrier frequency $f_t$, or by the central office selection of an unused carrier frequency $f_e$, and in the former case $f_e$ is determined when $f_t$ is selected, whereas in the latter case $f_t$ is determined when $f_e$ is selected.

Typically, for the case where the subscriber initiates a call, each subscriber station includes means operable in response to subscriber call initiation to select an unused carrier frequency $f_t$ from a group of carrier frequencies, to intelligence modulate the selected frequency and to pass the modulated carrier frequency to the transmission line, in which event the central station includes means operable to intelligence modulate an unused carrier frequency $f_e$ and to pass the modulated $f_e$ to the line, the carrier frequency $f_e$ typically being predetermined by the subscriber station selection of $f_t$. Further, fore the case where the central office calls the subscriber, the central office may include means operable in response to central station call initiation to select an unused carrier frequency $f_e$ from a group of carrier frequencies, to intelligence modulate $f_e$ and to pass modulated $f_e$ to the line, in which event the subscriber station includes means operable to intelligence modulate an unused carrier frequency $f_t$ and to pass modulated $f_t$ to the line, the carrier frequency $f_t$ being predetermined by the central station selection of $f_e$. Thus if $f_t$ is unused and selected by the subscriber, $f_e$ will also be unused and selected for modulation by the central office equipment, and if $f_e$ is unused and selected by the central office, $f_t$ will also be unused and selected for modulation by the subscriber equipment. In these regards, the subscriber station will include means to receive modulated $f_e$ from the line and to demodulate the received and modulated $fe$, whereas the central station will include means to receive modulated $f_t$ from the line and to demodulate the received and modulated $f_t$. Further, the invention contemplates that the carrier frequencies $f_t$ and $f_e$ may be broadly considered as intelligence channels subject to different types of modulation, as for example frequency or time division multiplexing, or pulse code modulation.

Other objects and advantages of the invention include the provision of a system as described wherein the number of subscriber stations exceeds the number of carrier frequencies in the first group, and also exceeds the number of carrier frequencies in the second group; whereby the amount of equipment needed for first class service may be reduced in relation to that conventionally required; and the provision of logic at each subscriber station to select unused $f_t$, and to effect intelligence modulation of $f_t$ in response to selection of unused $f_e$ by the central office; the provision of logic at the central station to select unused $f_e$, and to effect intelligence modulation of $f_e$ in response to selection of unused $f_t$ by the subscriber station.

These and other objects and advantages of the invention, as well as the details of an illustrative embodiment, will be more fully understood from the following detailed description of the drawings, in which.

Figure 1:
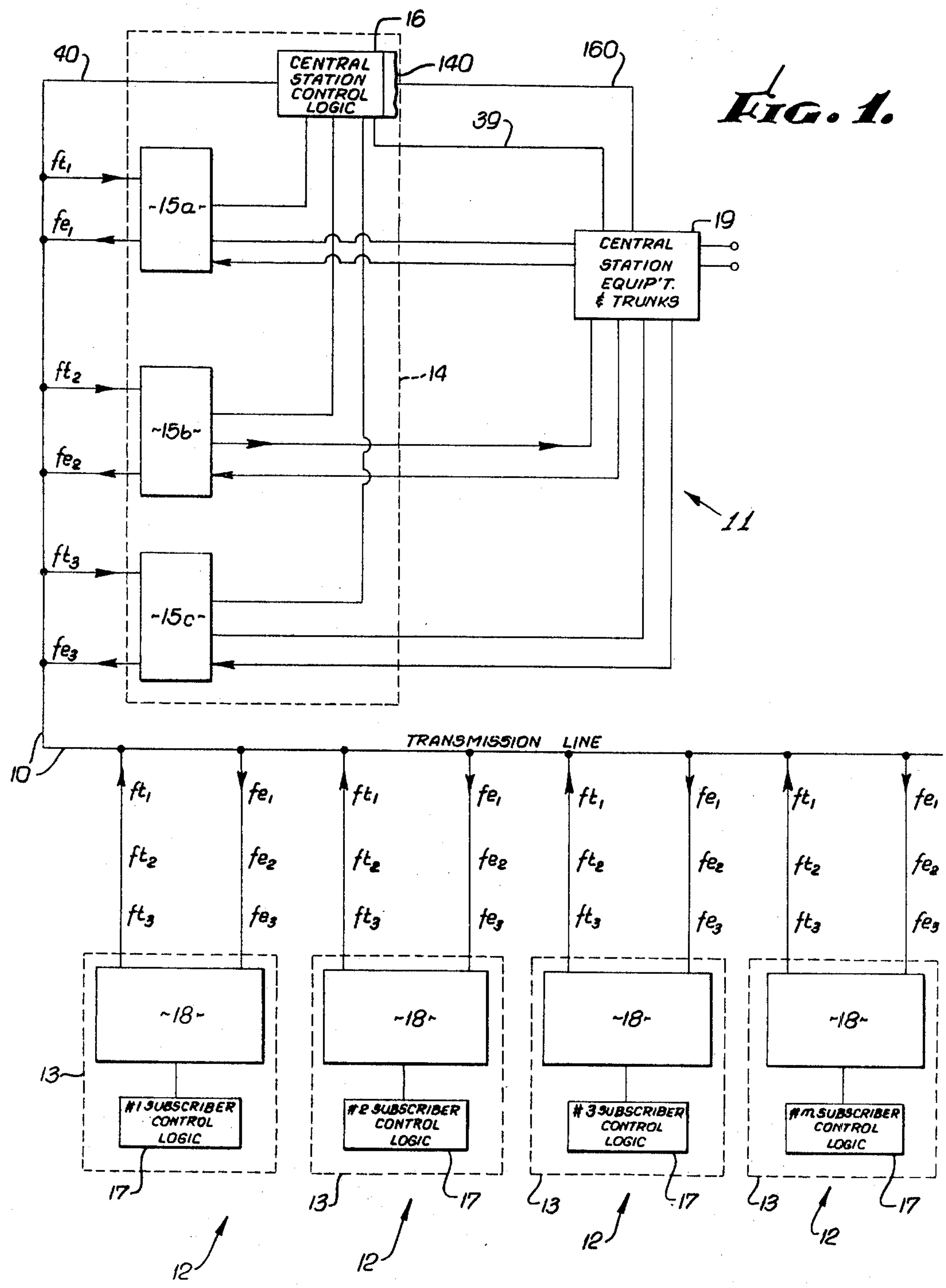
FIG. 1 is a diagrammatic showing of the overall system.

Referring first to FIG. 1, the common transmission line has connected to it a central station 11 and a number of subscriber stations 12. Each subscriber station includes means, generally designated at 13, operable in response to subscriber call initiation to select an unused transmission channel from a first group of transmission channels, to intelligence modulate the selected channel transmission mode $f_t$ and to pass the modulated mode $f_t$ to the line. While only three channels, as for example carrier frequencies, $f_{t1}$, $f_{t2}$ and $f_{t3}$ are shown as available to each subscriber, more channels may be provided.

The central station includes means, generally indicated at 14, operable in response to central station call initiation to select an unused transmission channel from a second group of transmission channels, to intelligence modulate the selected channel transmission mode $f_e$ and to pass the modulated mode to the line 10. Within the illustrated second group are modes, as for example carrier frequencies, $f_{e1}$, $f_{e2}$ and $f_{e3}$. Four subscriber stations are illustrated, although more may be provided, it being an important advantage afforded by the invention that there are more subscriber stations than the number of channel modes or carrier frequencies $f_t$ in the first group, or the number of channel modes or carrier frequencies $f_e$ in the second group, first class service being retained.

The central office means 14 incorporates circuit blocks 15*a*, 15*b* and 15*c*, associated with modulation of $f_e$ as well as demodulation of $f_t$, and logic 16 connected with each block in order to select $f_{e1}$, $f_{e2}$ or $f_{e3}$, depending upon its unused status. Thus, if $f_{e1}$ is selected, block 15*a* will be activated to transmit on channel $f_{e1}$ and receive on channel $f_{t1}$, whereas if $f_{e2}$ is selected block 15*b* will be activated to transmit on channel $f_{e2}$ and receive on channel $f_{t2}$, etc. The blocks 15 are connected with trunk equipment designated at 19 for further and conventional processing of incoming and outgoing calls.

Each subscriber station means 13 includes logic, indicated at 17, having the functions of selecting an unused $f_t$ where the subscriber initiates the call, and also of effecting intelligence modulation of $f_t$ in response to the selection of $f_e$ by the central station, the circuit block 18 carrying out the modulation of $f_t$ and demodulation of $f_e$. Also, the central station logic 16 not only has the function of selecting $f_e$ where the central station initiates the call, as for example is incoming from trunk 19, but in addition logic 16 effects intelligence modulation of $f_e$ in response to the selection of $f_t$ by the subscriber station logic. Thus, if a subscriber station initiates a call on $f_{t1}$, central office logic 16 activates circuit block 15*a* associated with demodulation of $f_{t1}$ and modulation of $f_{e1}$, or if the central office initiates a call on $f_{e2}$, the central office logic activates block 15*b* and the subscriber logic 17 activates block 18 associated with the subscriber who is rung, that block carrying out demodulation of $f_{e2}$ and modulation of $f_{t2}$. t ql Turning now to FIG. 2, one form of the central station block 15*a* is depicted above the transmission line 10, and one form of the subscriber block 18 is shown below the line 10. Connected in series from line 10 to trunk 19 in block 15*a* are the high pass filter 20 to pass $f_t$ but not $f_e$ frequencies, automatic gain control amplifier 21, demodulator 22, audio output amplifier 23, transformer 24 and relay controlled switches 25. When switches 25 are closed by relay coil 26 operated by driver 27 in response to reception of $f_{t1}$, the demodulated version of $f_{t1}$ is transmitted to the trunk 19. Control logic 16 controls a gate 32 to apply $f_{t1}$ unmodulated to the demodulator 22 via a phase lock circuit 29. The latter also has an input at 31 from amplifier 21 to lock the phase of $f_{t1}$ unmodulated and supplied to the demodulator at 30 to the phase of $f_{t1}$ modulated. Thus logic 16 controls the demodulator 22.

Control logic 16 also controls a gate 34 to supply carrier $f_{e1}$ to the modulator 35. The latter has its audio input side connected at 36 and via switches 25 to the output from the trunk 19. The modulated carrier $f_{e1}$ is passed via low pass filter 37 and amplifier 38 to the line 10. Logic 16 responds to an incoming trunk call, as by connection 39, to select $f_{e1}$, $f_{e2}$, or $f_{e3}$, depending upon which of these carriers is unused. If carrier $f_{e1}$ is selected, then the demodulator 22 for $f_{t1}$ is enabled, as described. Logic 16 also responds to an incoming subscriber call $f_{t1}$, as by connection 40, to enable the demodulator 22 for $f_{t1}$, and also to enable the modulator 35 for $f_{e1}$, as described.

Attention is now directed to the subscriber equipment seen in FIG. 2 below line 10. Connected in series from line 10 to telephone set 45 are the low pass filters 46 for $f_{e1}$, or $f_{e2}$ or $f_{e3}$, automatic gain control amplifier 47, demodulator 48, audio output amplifier 49, and transformer 50, the subscriber telephone input signal being developed across transformer winding 51. Subscriber logic 17 has a recognition connection 54 to line 10 for controlling a gate 52 to enable selective transmission of unmodulated $f_{e1}$, $f_{e2}$ or $f_{e3}$ to the demodulator 48 via a phase lock circuit 53. The latter also has an input at 55 from amplifier 47 to lock the phase of unmodulated $f_{e1}$ for example and supplied to the demodulator at 56 to the phase of $f_{e1}$ modulated supplied at 57 to the demodulator.

Control logic 17 also controls gate 58 to supply an unused carrier $f_{t1}$, or $f_{t2}$ or $f_{t3}$ to the modulator 59, the latter having its audio input side connected at 60 to the output from the telephone set 45. That output is applied across resistor 61, capacitor 62, and coil 52, for example. The modulator carrier $f_{t1}$, $f_{t2}$ or $f_{t3}$ is passed via amplifier 63 to the line 10. Logic 17 responds to the calling subscriber's lifting of the telephone set receiver to select $f_{t1}$, $f_{t2}$ or $f_{t3}$, depending upon which of these carriers is unused. If carrier $f_{t1}$ is selected, then demodulator 48 for $f_{e1}$ is enabled via gate 52, as described.

Logic 17 also responds to an incoming central station call $f_{e1}$ for example, as by the recognition connections 54 and 71, to enable the demodulator 48 for demodulating $f_{e1}$, and also to enable the modulator 59 for use of carrier $f_{t1}$, as described. In the event of such an incoming call, a ringer circuit is first actuated, the latter including amplifier 67 having its input connected to the demodulator output at 68, transformer 69 and ringer 70. The recognition connection at 71 recognizes lifting of the subscriber's receiver. If the subscriber is making the call, the connection 71 enables the logic 17 to commence the search for an available frequency $f_{t1}$, $f_{t2}$ or $f_{t3}$. If none are available, a busy signal is returned to the receiver. Connection 76 disables the ringing circuit when the logic detects that the subscriber's receiver has been lifted.

Figure 2:
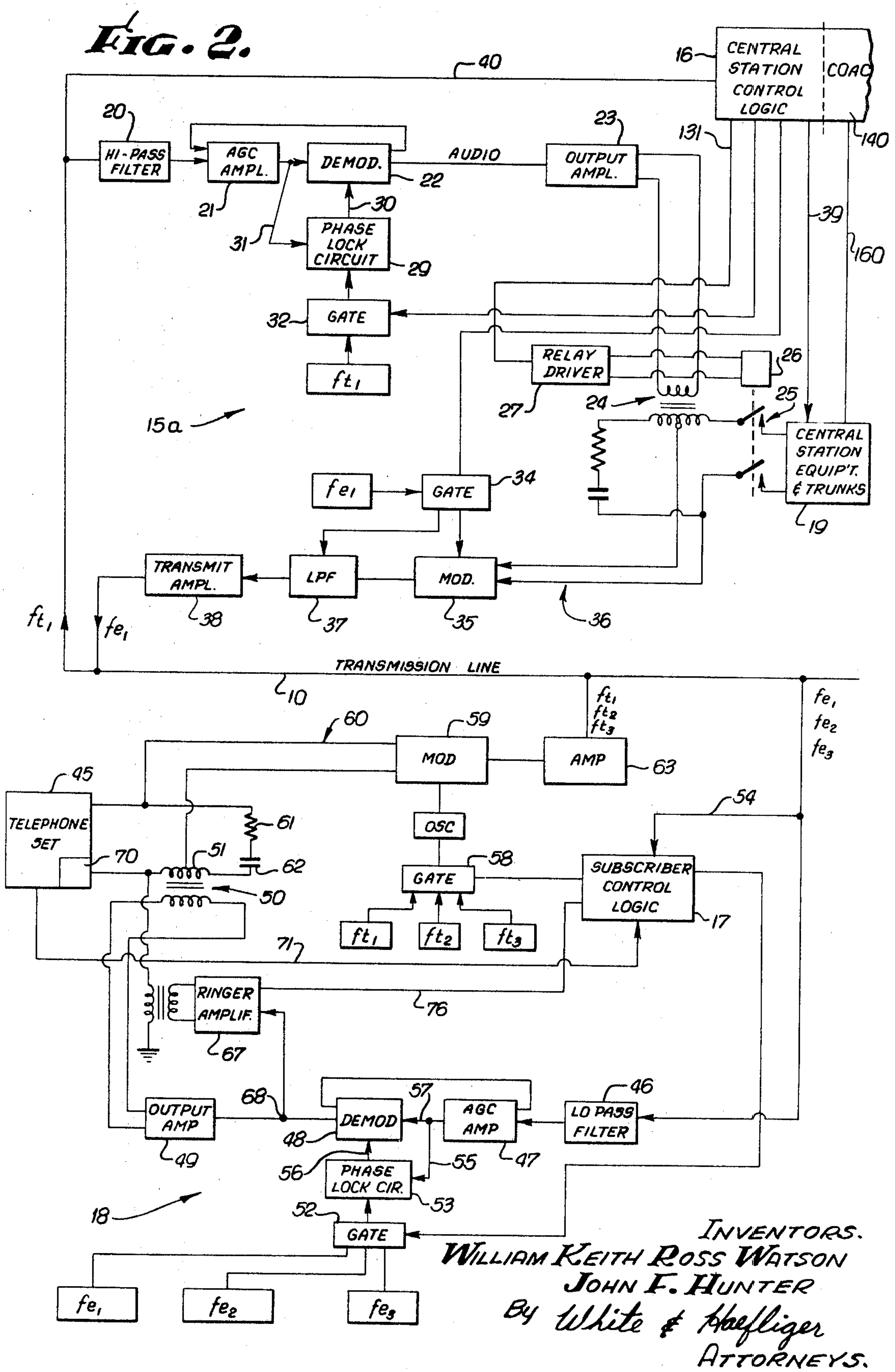
FIG. 2 is a block diagram showing of the central station and a subscriber station.
Figures 3, 4:
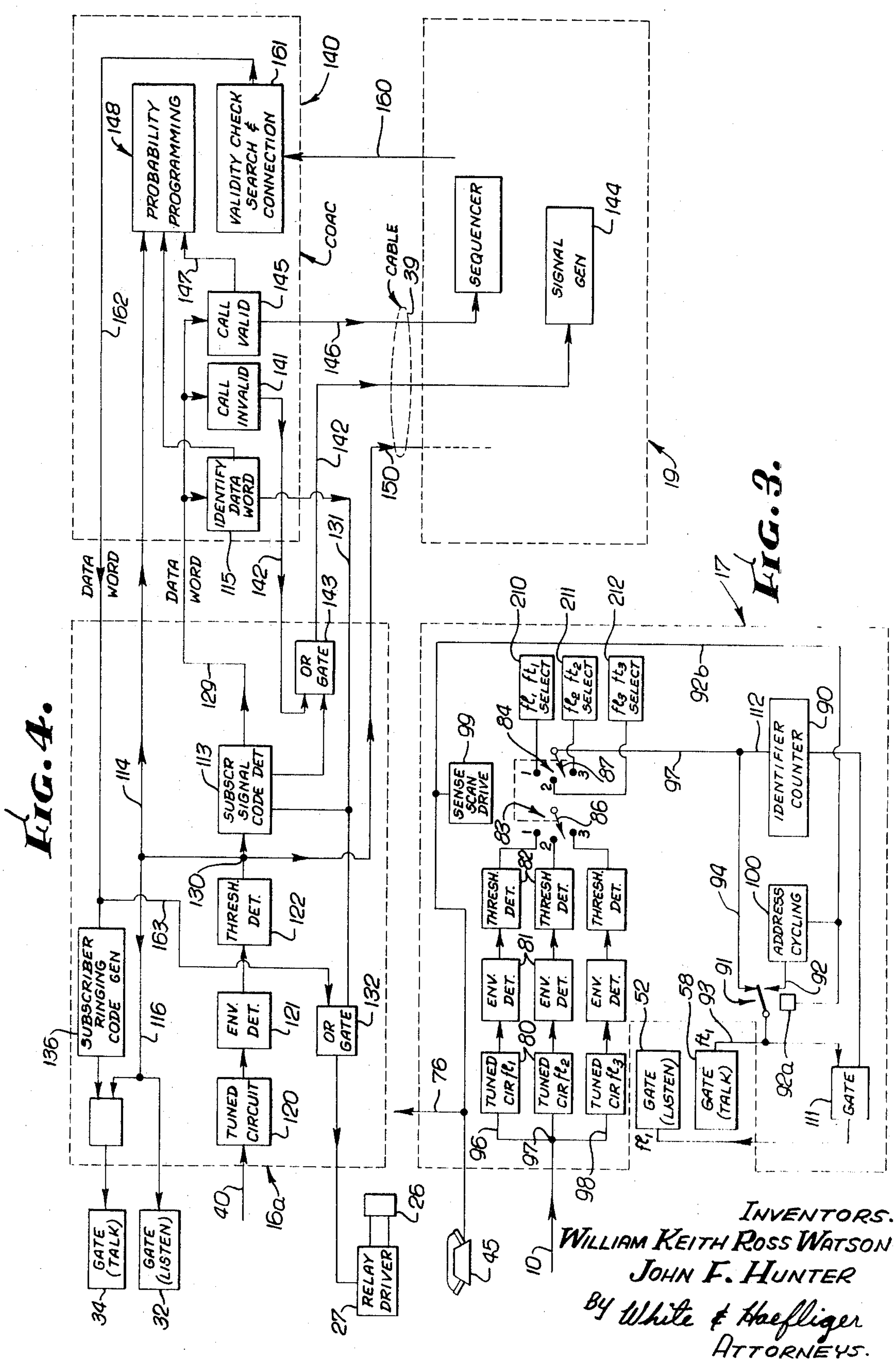
FIG. 3 is a diagrammatic showing of subscriber station logic circuitry.
FIG. 4 is a diagrammatic showing of central station control logic circuitry.

Referring now to FIG. 3 showing one form of subscriber's logic 17, attention is first directed to the address cycling device 100. When the subscriber's telephone set 45 is on-hook, the device 100 is enabled via connection 92, and it therefore cycles to enable the gate 58 (via connection 92, switch 91 and connection 93) to pass the carriers $f_{t1}$, $f_{t2}$ and $f_{t3}$ in cyclic succession, and to enable gate 52 (via gate 111) to pass the carriers $f_{e1}$, $f_{e2}$ and $f_{e3}$ in cyclic succession. Switch 91 is controlled at 92*a* and from connector 92*b*. Alternatively, the cycling may be limited to only unused carriers or channels. As a result, if a ringing signal is transmitted from the line 10 to the subscriber on carrier $f_{e1}$, the ringer amplifier 67 (see FIG. 2) will be activated when the address cycling device cycles through $f_{e1}$, in view of the phase lock circuit shown. The subscriber then lifts his receiver and talks.

When the subscriber lifts his receiver to off-hook condition in order to initiate a call, the address cycler device 100 is disabled and switch 91 is operated to pass a selected signal via line 94 to "listen" gate 52 and to "talk" gate 58 in order to enable those gates to gate unused carriers from the group $f_t$ and $f_e$. As regards such signal selection, any "listen" carriers $f_e$ in use on transmission line 10 enter the logic 17 and are fed to three or more parallel channels 96, 97 and 98 corresponding for example to carriers $f_{e1}$, $f_{e2}$ and $f_{e3}$. Assuming $f_{e2}$ is in use, channel 97 responds in view of the fact that only the tuned circuit 80 in that branch is in tune with, or is in band-pass relation with, $f_{e2}$.

Device 81 detects or demodulates the carrier envelope to provide a DC signal which is applied to threshold detector 82. The latter determines if the input is above a noise level chosen to prevent inadvertent activation due to noise. If the input is above that level, it is fed to terminal 02 of scanner 83.

Wiper 86 of scanner 83 is driven by drive 99 whenever receiver is off-hook, and wiper 86 locks on to the first terminal it "sees" which has no "in use" input, say in this instance terminal 01. Ganged wiper 87 likewise locks onto terminal 01 of scanner 84. The latter's terminals are connected with selection sources 210, 211 and 212 of signals operative to cause gates 52 and 58 to pass carriers $f_{e1}$ and $f_{t1}$, $f_{e2}$ and $f_{t2}$, and $f_{e3}$ and $f_{t3}$. Thus, when the wiper arm 87 is latched onto terminal 1, it serves to activate the gate 52 to pass carrier $f_{e1}$, and to activate gate 58 to pass carrier $f_{t1}$. The latter command passes to gate 58 via an AND gate 111 which is enabled by the identifier counter apparatus 90 enabled at 112 by the signal on cable 94. The apparatus 90 places on the carrier $f_{t1}$ passing to transmission line 10 a modulation embodying a code sequence identifying that subscriber, and that code sequence is detected at the central station, as will be described.

Referring now to FIG. 4, and assuming the subscriber is transmitting on carrier $f_{t1}$ together with a coded identification, these are transmitted via connection 40 seen in FIGS. 2 and 4 to the logic block 16, and specifically subsection 16*a* corresponding to circuit block 15*a* associated with demodulation of $f_{t1}$ and modulation of $f_{e1}$. The input signal is passed via tuned circuit 120, envelope detector 121 and threshold detector 122 corresponding to similar elements 80, 81 and 82 described in FIG. 3.

From the output junction 130 of the detector, the coded (say binary) subscriber identification signal is detected at 113 and transmitted at 129 as the subscriber caller's identifying data word to the central office activity computer or COAC 140. The section 115 of the latter, upon identification of the data word, transmits a signal at 131 via OR gate 132 to the relay driver 27, for actuating the latter as described above in FIG. 2. If the data word transmission 129 is not valid, section 141 of the computer so determines and signals the central station equipment and trunks 19 via line 142 and OR gate 143. A conventional signal generator 144 in the equipment 19 then informs the caller that the call is invalid (say, as by a busy signal). If, on the other hand, the computer determines that the data word transmission at 129 is valid, section 145 signals the equipment 19 via line 146 to initiate proper and conventional sequencing. A 'valid' output signal at 147 is communicated to the probability programming apparatus 178, the functioning of which will be described.

Referring back to junction 130, a suitable (say, "true") signal is also transmitted via line 116 to enable gate 32 to pass carrier $f_{t1}$, as seen in FIG. 2. A "true" output signal is also transmitted via line 114 to the computer 140 to activate the probability programmer 148, and a further "true" output signal is transmitted at 150 to activate the equipment 19.

An incoming trunk call is transmitted at 160 to the computer 140 for validity check, unused carrier search and connection at block 161 to an output line 162. The latter has connection to the relay driver 27 via path 163; and to "talk" gate 34 via subscriber ringing code generator 136. The latter is activated to transmit the subscriber's ringing code via carrier $f_{e1}$.

In the determination of the number of channels necessary to accommodate the population of subscribers having access to the system, statistical methods are employed. The definition of "accommodate" is the particular class of service, i.e. one failure in 1,000 tries represents first class service.

If, for example, all parties are to have private service, the calculation would be as follows:

$$P\{x \text{ lines in use}\}=\binom{Ns}{x}p^x(1-p)^{N_s-x} \quad (1)$$

$$P\{\text{failure}\}=p\{n>N_l\}=1-\sum_{i=1}^{i=Nc}\binom{Ns}{L}p^i(1-p)^{N_s-i} \quad (2)$$

where:

$P$=average statistical probability that a private party is using a channel
$N$=number of channels
$Ns$=number of subscribers
$n$=number of channels busy Given: P, and $N_s$, the problem is to find by equation (2) the minimum number of channels, $N_c$, such that P is less than or equal to (x failures/1,000 tries).

The above is useful in determining $N_c$ once given $N_s$, or, conversely, determining $N_s$ once given $N_c$. It should be noted that this represents the simplest case, namely that of all private lines, and that the channel determination concept should include all possible combinations of private and multiparty lines.

With this background of probability theory application, it is possible to see what would happen in the event all subscribers on a single system are above the predicted average probability, P. This infers that the class of service is less than the designed class and that if the mismatch is extreme, bad relations will exist. Similarly, if there exists a predominance of subscribers that are far below the average users, there is a waste of lines.

When the system is first set up, lines are assigned in a manner consistent with equation (2) with a priori delay line distributions.

The central office must keep a record of message unit originating calls for purposes of billing. These records are kept by the central office activity computer. The known devices sampled to determine usage are now instrumented in such a way that the composite $N_c$ channels activity is sensed, as for example in block 148.

The computer block 148 continually and sequentially tests each of the subscriber logic levels to determine activity. When activity is sensed, as via line 147, the computer is programmed to store this information and to increment a register recording the running count of time elapsed.

After all subscribers have been sampled, the computer performs a search on a system by system basis to determine system activity. System registers are updated depending on whether 0, 1, 2 or $e$ lines are in use.

The previous computer operation is now repeated and the process continues. Once an optional period of time has elapsed, each system record is interrogated as to channel activity (perhaps only during busy hour). The reading denoted by the content of the register containing $N_c$ activity information should, within statistical limits, approximate equation (1) with $\chi = N_c$. Also, the cumulative distributions should also correspond to equation (2) which has been presented as the most simple form for explanation purposes. In the event excessive use is implied, the computer then, under options available to the total systems operator, signals that a problem exists and to what extent, requests whether an optical display of the particular problem system is required, and finally logically determines by appropriate probability algorithms, the best remedies. Also, the computer will, upon manual intervention, issue the paper work and detail to service departments. The same type of action will take place in the event of excessive inactivity.

Where reference has been made herein to methods for modulating carrier frequencies, it will be understood that frequency division or time division multiplex techniques may be used.

We claim:

1. In a multichannel telephone system:
a. a transmission line;
b. a central station;
c. a plurality of subscriber stations;
d. each subscriber station including means operable in response to subscriber call initiation to select an unused transmission channel from a first group of transmission channels, to intelligence modulate the selected channel transmission mode $f_t$ and to pass the modulated mode $f_t$ to the line;
e. the central station including means operable in response to central station call initiation to select an unused transmission channel from a second group of transmission channels, to intelligence modulate the selected channel transmission mode $f_e$ and to pass the modulated mode $f_e$ to the line;
f. each subscriber station including a demodulator to which second group signals $f_{e1}$, $f_{e2}$—$f_{en}$ including modulated $f_e$ are transmitted from the central station, and to which unmodulated signals $f_{e1}$, $f_{e2}$—$f_{en}$ are selectively transmitted via a gate, there being logic circuitry responsive to central station call initiation to control the gate to transmit unmodulated $f_e$ corresponding to modulated $f_e$; and
g. the central station including means to receive the modulated mode $f_t$ from the line e2—$f_{and\ modulated\ mode}$ $f_t$.

2. In a carrier wave telephony system:
a. a transmission line;
b. a central station; and
c. a plurality of subscriber stations;
d. each subscriber station including means operable in response to subscriber call initiation to select an unused carrier frequency $f_t$ from a first group of carrier frequencies, to intelligence modulate $f_t$ and to pass the modulated $f_t$ to the line;
e. the central station including means operable in response to central station call initiation to select an unused carrier frequency $f_e$ from a second group of carrier frequencies, to intelligence modulate $f_e$ and to pass modulated $f_e$ to the line;
f. each subscriber station including a demodulator to which second group signals $f_{e1}$, $f_{e2}$—$f_{en}$ including modulated $f_e$ are transmitted from the central station, and to which unmodulated signals $f_{e1}$, $f_{e2}$—$f_{en}$ are selectively transmitted via a gate, there being logic circuitry responsive to central station call initiation to control the gate to transmit unmodulated $f_e$ corresponding to modulated $f_e$;
g. the central station including means to receive modulated $f_t$ from the line and to demodulate the received and modulated $f_t$; and
h. the number of subscriber stations always exceeding the number of said carrier frequencies in each of said groups.

3. The combination of claim 1 wherein uncalled subscriber station logic circuitry includes scanner means to detect the transmission of modulated $f_{e1}$ and to select unused channel modes $f_{e2}$ and $f_{t2}$ for communication with the central station.

4. The combination of claim 2 in which said subscriber station logic circuitry is operable to select $f_t$, and said central station means includes logic circuitry to effect intelligence modulation of $f_e$ in response to the selection of $f_t$ by the subscriber station logic.

5. The combination of claim 2 in which said central station means includes logic circuitry to select $f_e$, and said subscriber station logic circuitry effects intelligence modulation of $f_t$ in response to the selection of $f_e$ by the central station logic.

6. The combination of claim 4, in which said central station logic includes means to detect $f_t$ and to identify which subscriber is intelligence modulating $f_t$.

UNITED STATES PATENT OFFICE

CERTIFICATE OF CORRECTION

Patent No. 3,548,106 Dated December 15, 1970

Inventor(s) William Keith Ross Watson and John F. Hunter

It is certified that error appears in the above-identified patent and that said Letters Patent are hereby corrected as shown below:

Column 6, line 28; "lated mode $f_t$ from the line e2-$f_{and}$ modulated mode $f_t$." should read --lated mode $f_t$ from the line and to demodulate the received and modulated mode $f_t$ .-

Signed and sealed this 1st day of June 1971.

(SEAL)
Attest:

EDWARD M.FLETCHER,JR.
Attesting Officer

WILLIAM E. SCHUYLER, JR.
Commissioner of Patents